United States Patent Office 3,420,634
Patented Jan. 7, 1969

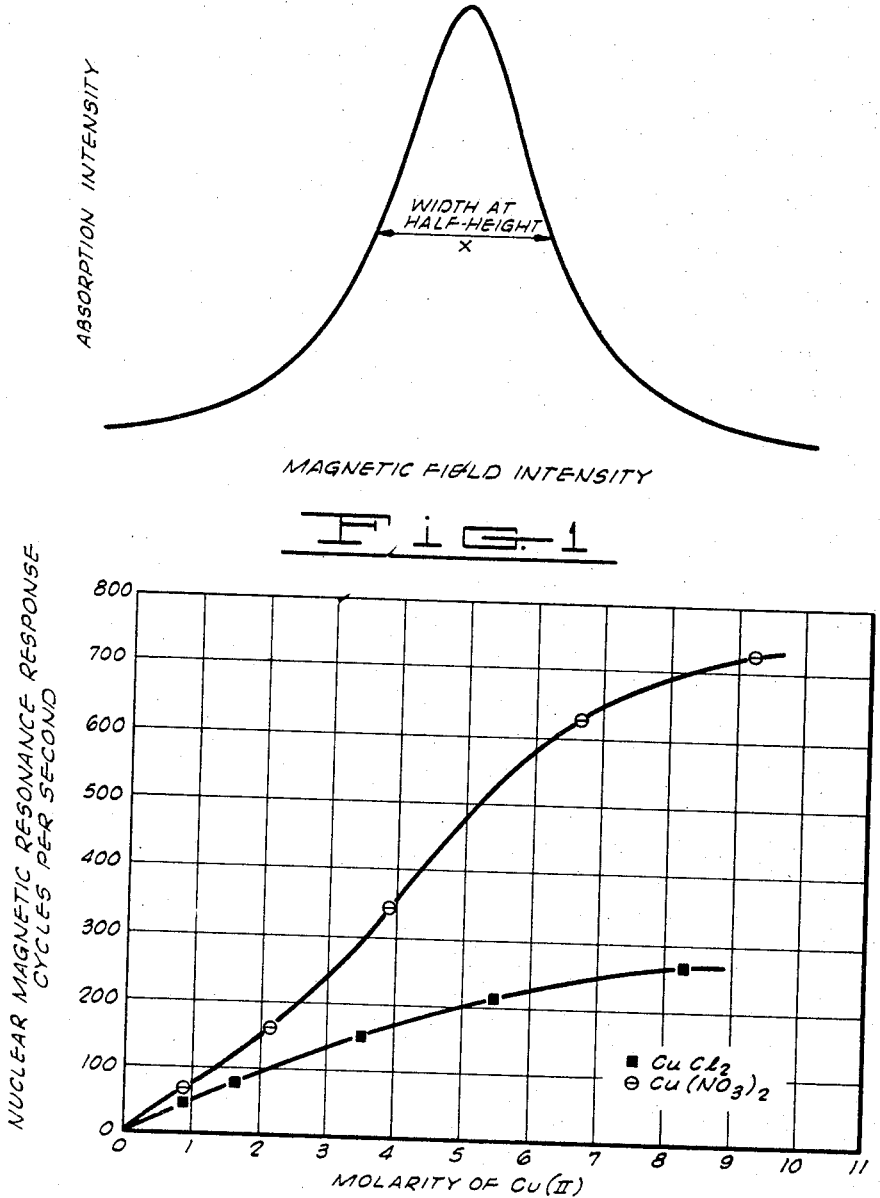

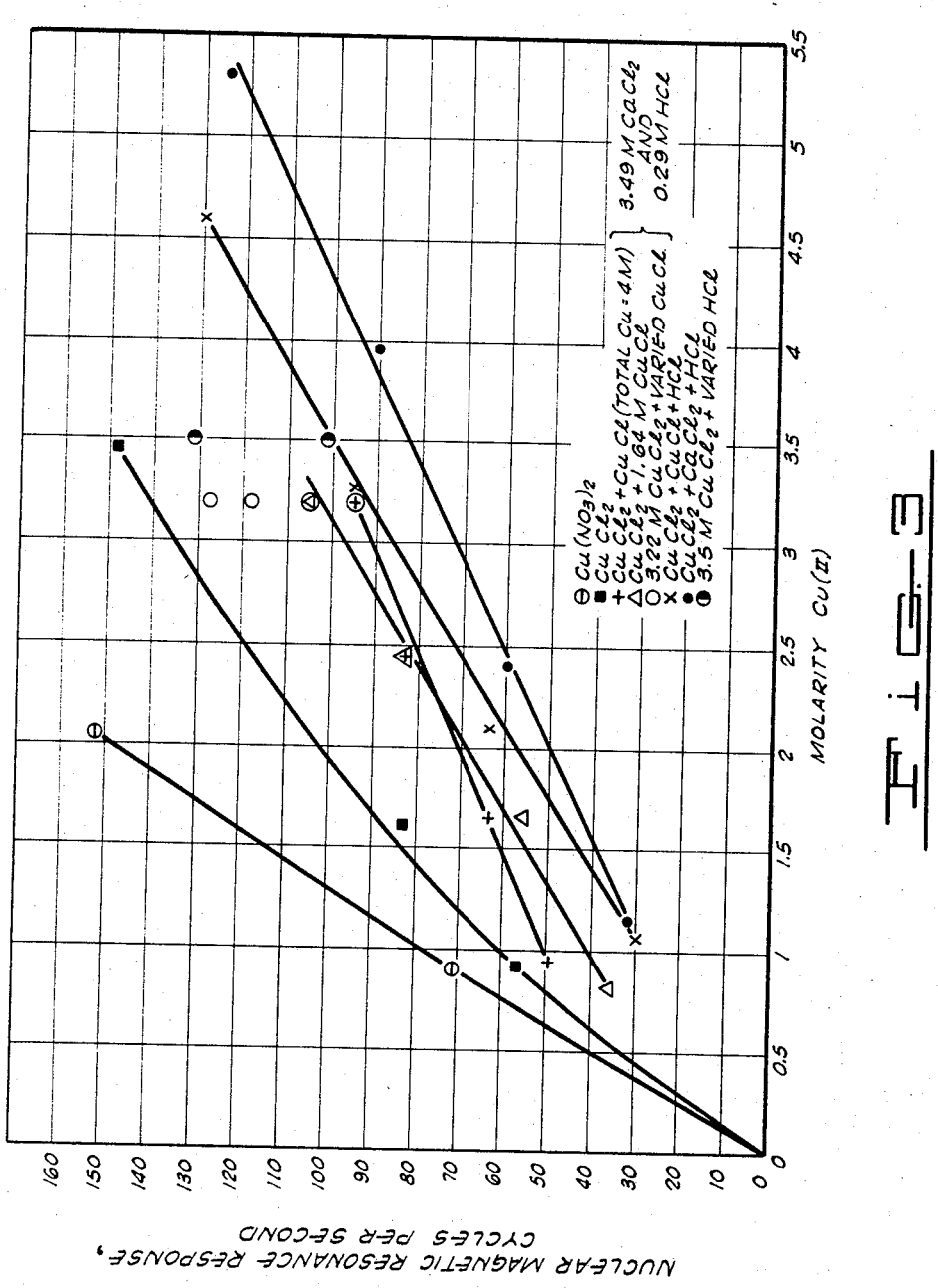

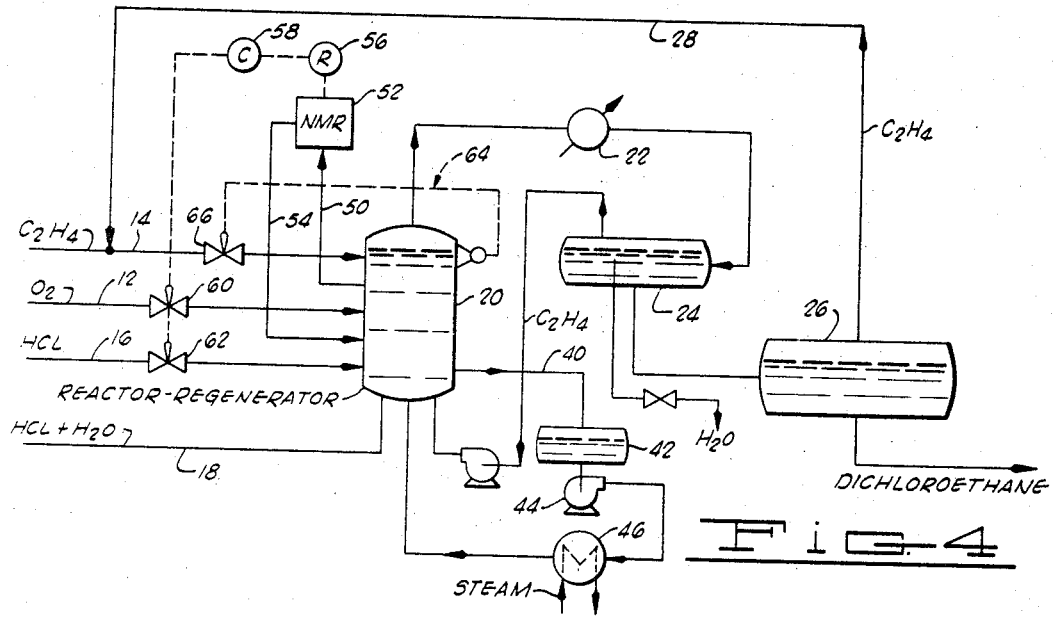
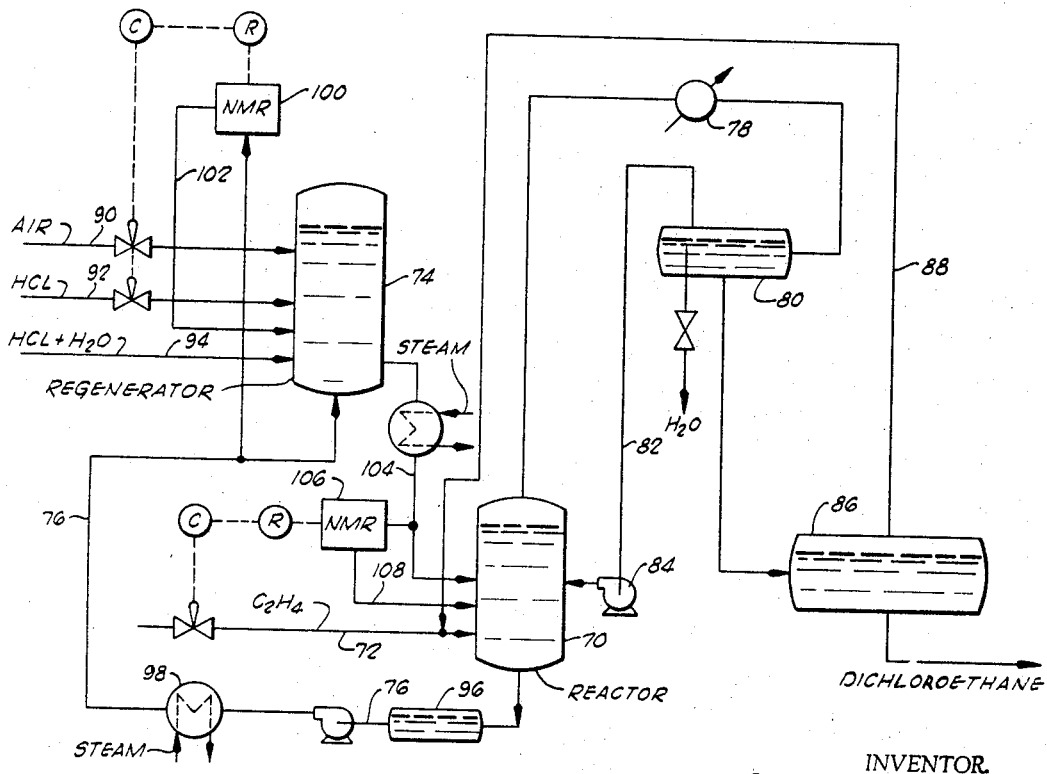

3,420,634
METHOD FOR DETERMINING THE CONCENTRATION OF CUPRIC IONS IN THE PRESENCE OF CUPROUS IONS BY NUCLEAR MAGNETIC RESONANCE
Charles E. Godsey, Ponca City, Okla., assignor to Continental Oil Company, Ponca City, Okla., a corporation of Delaware
Filed Oct. 13, 1964, Ser. No. 403,598
U.S. Cl. 23—230      11 Claims
Int. Cl. G01n 31/00

ABSTRACT OF THE DISCLOSURE

A method of continuously monitoring and controlling the ratio of cupric to cuprous ions in solution by the use of nuclear magnetic resonance (NMR). The NMR spectrum line for the water proton in an aqueous solution containing cupric and cuprous ions, and containing no other paramagnetic or ferromagnetic ionic species, has a width as measured at one half of its amplitude which is directly proportional to the concentration of the cupric ion.

---

This invention relates to a process for quantitatively determining the concentration of cupric ions in the presence of cuprous ions. More particularly, but not by way of limitation, the present invention comprises a method for continuously determining the concentration of cupric ions in an aqueous solution consisting essentially of cupric and cuprous ions and containing no other ions which are paramagnetic or ferromagnetic. In a particular embodiment of the invention, the invention relates to a method for continuously monitoring the ratio of cupric to cuprous ions in a process for manufacturing dichloroethane by the aqueous chlorination of ethylene.

At present there are no known methods for instrumentally determining the concentration of cupric ions in a system which also contains cuprous ions. Chemical methods are available for independently determining the concentration of both of these ions, but such methods require isolation of a test sample and consumption of a portion of the sample in the analytical techniques employed. These analytical procedures are thus relatively expensive, and the time delays which are involved in such chemical methods make them less than optimum for use in monitoring the concentration of these ions in continuously flowing plant streams.

Some processes are now in use or are proposed which employ copper salts as catalysts in the promotion of certain chemical reactions, and catalyst systems of this type may contain copper ions in both the cupric and cuprous valence states. If the concentration of the higher valence form of copper is a critical factor in the effectiveness of the catalyst, it becomes very desirable to have available a method for rapidly and nondestructively determining the cupric ion concentration in the catalyst system so that the necessary adjustments in such concentration may be made in order to maintain the catalyst in its highest state of effectiveness.

The present invention comprises a method for instrumentally determining the concentration of cupric cations in the presence of cuprous cations in an aqueous solution using nuclear magnetic resonance spectroscopy. The method is rapid and is non-destructive in character, being especially well-adapted for use in continuously determining the cupric ion content of flowing process streams containing no paramagnetic or ferromagnetic ions other than the cupric and cuprous cations. By paramagnetic ions is meant those ions which have a net permanent magnetic moment even in the absence of an applied external magnetic field.

In a yet more specific, particularly useful, application of the analytical technique of the invention, the cupric ion concentration is continuously determined in a continuous process for producing 1,2-dichloroethane by reacting HCl with oxygen and ethylene in the presence of a copper chloride catalyst. This synthesis may be carried out in two ways. In one of these, the process is carried out in a single reaction vessel in the presence of a copper chloride catalyst and proceeds by the reaction

$$2C_2H_4 + 4HCl + O_2 \rightarrow 2C_2H_4Cl_2 + 2H_2O \quad (1)$$

In the other method of synthesis, the process is carried out in two separate converter vessels as indicated by the reactions

$$C_2H_4 + 2CuCl_2 \rightarrow C_2H_4Cl_2 + 2CuCl \quad (2)$$

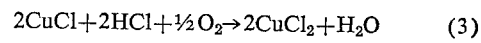
$$2CuCl + 2HCl + \tfrac{1}{2}O_2 \rightarrow 2CuCl_2 + H_2O \quad (3)$$

A solution of the cupric and cuprous chloride salts is used as the catalyst in this procedure. In both of the 1,2-dichloroethane processes described, it is important that the proper ratio of cupric to cuprous ions be maintained in the catalyst system. The amount of these two ionic species in the catalyst has previously been determined by chemical methods which require that samples be removed from the process stream, diluted and analyzed in the absence of air. Since samples must be frequently taken for analysis, this procedure results in the consumption of a large amount of expensive catalyst.

In accordance with the present invention, a small slip stream is continuously removed from the reaction vessel and the catalyst regeneration vessel (in the case of the second, two-stage process) and passed through a nuclear magnetic resonance spectrometer where the spectrum of the slip stream solution is obtained to provide an indication of the total concentration of cupric ion present. Since the total copper concentration in the system is maintained at a constant value, the concentration of cuprous ion and the ratio of cupric to cuprous ions can be obtained by difference. The spectroscopic measurement can be used to control process conditions so as to maintain the Cu (II) to Cu (I) ratio at the desired level.

The analytical technique of the invention is based upon the nuclear magnetic resonance (hereinafter referred to as NMR) spectrum of aqueous solutions containing cupric and cuprous cations and no other paramagnetic or ferromagnetic ions. This system shows only one spectral line. This is the resonance line of the ′H proton and can be produced using a frequency of 60 mc./sec. and a magnetic field of about 14,092 gauss. I have discovered that the width of this spectrum line is directly proportional to the concentration of the cupric ion, and interferences from the cuprous ion and ions which are neither paramagnetic nor ferromagnetic appear to be negligible. The response of NMR spectroscopy to the cupric ion concentration appears to some extent, however, to be dependent upon the total concentration of ionic species present in the aqueous solution. Thus, for a given system in which the cupric and cuprous ion concentrations are the only variants, standard proton response curves for the specific system under study should be obtained for comparison with the actual spectroscopic measurements obtained upon analysis.

Broadly described, then, the present invention contemplates a method for determining the concentration of cupric ions in the presence of cuprous ions in a common, unknown aqueous solution, which method comprises initially determining the total concentration and qualitative character of ionic types other than cupric and cuprous ions in the unknown solution in which the cupric ion is to be determined; developing a standard curve for known aqueous solutions in which the determined concentration of said other ionic types is duplicated and in which cupric ion concentration is plotted against the width of the NMR spectrum line for the water proton for various known concentrations of cupric ion in said known aqueous solutions; obtaining the NMR water proton spectrum of said unknown aqueous solution containing the unknown concentration of cupric ion which it is desired to determine; measuring the width of the water proton spectral line appearing in the NMR spectrum obtained for the unknown aqueous solution; and determining the concentration of cupric ion in said unknown solution by comparing the measured width of said water proton spectral line with said standard curve.

The described method for determining the concentration of cupric ions in a solution containing both cupric and cuprous ions is rapid, nondestructive of the sample, and is substantially independent of temperature and to pressure. The ratio of cupric to cuprous ions does not appear to affect the sensitivity or accuracy of the determination, and the method has been used for determining cupric ion concentration in solutions containing from slightly more than zero or a negligible amount of the cupric ion to 9 molar concentrations of this ion.

From the foregoing description of the invention, it will have become apparent that it is a major object of the present invention to provide an improved analytical technique for determining the concentration of cupric ions in an aqueous solution which contains both cupric and cuprous ions.

A more specific object of the present invention is to provide an instrumental method for determining cupric ion concentration, which method is especially useful and advantageous in aqueous solutions which additionally contain cuprous ions.

A further object of the present invention is to provide a method for continuously monitoring the ratio of cupric to cuprous ions in a continuous process which uses a mixture of these ions in a catalyst system for promoting the process.

An additional object of the present invention is to provide a rapid and efficient method for monitoring and maintaining the efficiency of a catalyst used in the preparation of 1,2-dichloroethane by the oxyhydrochlorination of ethylene.

Other objects and advantages of the invention will become apparent as the following detailed description of the invention is considered in conjunction with the accompanying drawings which illustrate various aspects of the invention.

In the drawings:

FIGURE 1 is an illustration of the recorded NMR spectral absorption line obtained for the water or 'H proton in an aqueous solution containing cupric ions.

FIGURE 2 is a graph illustrating the manner in which the NMR spectrometer varies in its response to two aqueous solutions containing, in one case, cupric nitrate, and in the other case, cupric chloride.

FIGURE 3 is a graph illustrating the effect upon the NMR spectrometer response of the inclusion of various types and quantities of ionic species in addition to the cupric ion in an aqueous solution under analysis.

FIGURE 4 is a process flow diagram illustrating the manner in which the present invention is utilized to monitor and control the catalyst used in preparing 1,2-dichloroethane in a single vessel process in accordance with reaction (1) hereinbefore set forth.

FIGURE 5 is a flow diagram similar to FIGURE 4, but illustrating the manner in which the method of the present invention for determining cupric ion concentration is utilized for monitoring and controlling the activty of the copper chloride catalyst used in the two-step process for producing 1,2-dichloroethane in accordance with reactions (2) and (3) hereinbefore set forth.

Referring now to the drawings in detail, and particularly, to FIGURE 1, a typical 'H nuclei (proton) absorption obtained by nuclear magnetic resonance spectroscopy of an aqueous, cupric ion containing solution is illustrated. The water proton spectral line depicted was obtained utilizing a 60 megacycle nuclear magnetic resonance spectrometer system of the high resolution type, such as the DP–60 NMR spectrometer manufactured and marketed by Varian Associates of Palo Alto California. This type of instrument provides a magnetic field intensity of 14,092 gauss, and provides an R–F field at the sample of from 14 microgauss to 200 milligauss. The spectrum was recorded using an X-Y recorder equipped with a synchronous motor driven time base for better linearity. The recorder scan rate used to obtain the spectrum was 3 inches/min. and the field sweep rate was equivalent to 7.7 cycles per sec./sec. At this sweep rate R–F power as high as 50 decibels below 0.5 watt could be used without overloading the detector.

I have observed that the NMR spectrum line (absorption mode) for the water proton in an aqueous solution containing cupric and cuprous ions, and containing no other paramagnetic or ferromagnetic ionic species has a width as measured at one-half of its amplitude which is directly proportional to the concentration of the cupric ion. The width of the spectrum line to which reference is made, and which is measured in evaluating the concentration of cupric ion, is designated by X in FIGURE 1. The particular concentration of cupric ions in the aqueous solution subjected to NMR spectrometric analysis does not appear to be critical, or to affect the accuracy of the analysis, and aqueous solutions ranging in concentration from just above zero moles of dissolved cupric salt to as high as 9 moles of the salt (approximately the limit of solubility) have been effectively analyzed by this technique. The ratio of cupric to cuprous ions also does not appear to affect the accuracy or validity of the analysis, and either the cupric or cuprous species may predominate in the solution. The temperature of the solution is not critical to the analysis except that the temperature should be made at a sufficiently high level to assure that all of the cupric and cuprous salts are maintained in solution. It is also desirable to maintain the temperature in solution analyses within 20° C. and preferably within 10° C. of the temperature at which the standard curve used for comparison (as hereinafter explained) is obtained.

Examples

Using the Varian DP–60 NMR spectrometer and the X–Y recorder hereinbefore described, cupric ion concentration versus NMR response curves were developed for a number of aqueous solutions containing various ionic species in varying concentrations. All reagents used except the cuprous chloride were analytical grade and were used without further purification. The cuprous chloride was prepared from technical grade CuCl by precipitation from dilute HCl solution and was dried in a nitrogen-filled dry box. The cupric nitrate reference standards were prepared from reagent grade

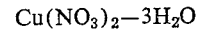

$Cu(NO_3)_2$—$3H_2O$

Approximately 1 ml. of each sample was prepared in a Pyrex tube of 4 mm. inside diameter and 5 mm. outside diameter. The samples were analyzed at 136° C. after the tubes were sealed to prevent vaporization of the water. The relatively high temperature is necessary in such systems in order to maintain the catalyst in solution.

In obtaining the spectrometer response for each of the samples, the absorption mode of the NMR signal was used for measuring the line width of 'H nuclei signals rather than the dispersion mode. The dispersion mode can be utilized with equal facility in the analysis, however, and actually may be more easily employed for continuous monitoring of processes employing copper chloride catalysts as hereinafter described. In using the absorption mode, the spectrum line width at one-half of its height was employed.

In Table I set forth below, the compositions of the various solutions tested by NMR spectroscopy is set forth.

between the widths of the water proton signal at half height and the molar concentration of the cupric ion in aqueous cupric chloride solutions appears to be linear for concentrations of the cupric ion up to about 1 molar. As the cupric ion concentration is increased above 1 molar, the effective magnetic moment of the cupric ion appears to decrease, resulting in a less rapid broadening of the

TABLE I

| Sample No. | Concentration in moles per liter | | | | | | Width of water proton signal at half-height (c.p.s.) | Symbol used on graph |
|---|---|---|---|---|---|---|---|---|
| | Cu (II) | Cu (I) | Ca++ | HCl | (NO₃) | Total Cl- | | |
| 1 | 0.89 | | | | | 1.78 | 57 | ¾ ■ |
| 2 | 1.63 | | | | | 3.26 | 83 | ¾ ■ |
| 3 | 3.49 | | | | | 6.98 | 149 | ¾ ■ |
| 4 | 5.44 | | | | | 10.88 | 218 | ¾ ■ |
| 5 | 8.20 | | | | | 16.40 | 250 | ¾ ■ |
| 6 | 0.93 | 2.83 | | 4.34 | | 9.03 | 30 | X |
| 7 | 2.11 | 2.83 | | 4.31 | | 11.36 | 63 | X |
| 8 | 3.26 | 2.69 | | 3.54 | | 12.75 | 95 | X |
| 9 | 4.56 | 2.54 | | 3.87 | | 15.53 | 128 | X |
| 10 | 1.14 | | 3.78 | 2.14 | | 11.98 | 33 | ¼ ● |
| 11 | 2.41 | | 3.95 | 2.24 | | 14.95 | 60 | ¼ ● |
| 12 | 4.08 | | 3.52 | 2.00 | | 17.20 | 90 | ¼ ● |
| 13 | 5.34 | | 3.40 | 1.93 | | 19.41 | 122 | ¼ ● |
| 14 | 0.82 | 3.22 | 3.49 | 0.29 | | 12.13 | 49 | + |
| 15 | 1.64 | 2.36 | 3.49 | 0.29 | | 12.91 | 64 | + |
| 16 | 2.46 | 1.64 | 3.49 | 0.29 | | 13.83 | 84 | Δ and + |
| 17 | 3.22 | 0.82 | 3.49 | 0.29 | | 14.53 | 95 | + and o |
| 18 | 3.22 | 1.64 | 3.49 | 0.29 | | 15.35 | 106 | Δ and o |
| 19 | 3.22 | 2.46 | 3.49 | 0.29 | | 16.17 | 118 | 0 |
| 20 | 3.22 | 3.22 | 3.49 | 0.29 | | 16.93 | 126 | 0 |
| 21 | 1.64 | 1.64 | 3.49 | 0.29 | | 12.19 | 57 | Δ |
| 22 | 0.82 | 1.64 | 3.49 | 0.29 | | 10.55 | 37 | Δ |
| 23 | 3.50 | | | 2.78 | | 9.78 | 131 | φ |
| 24 | 3.50 | | | 4.39 | | 11.39 | 100 | φ |
| 25 | 0.98 | | | | 1.80 | | 72 | θ |
| 26 | 2.05 | | | | 4.10 | | 155 | η |
| 27 | 3.92 | | | | 7.84 | | 347 | θ |
| 28 | 6.57 | | | | 13.14 | | 634 | θ |
| 29 | 9.19 | | | | 13.38 | | 718 | θ |
| 30 | | | | | | | | |

The data set forth in Table I were used as the basis for the graphs portrayed in FIGURES 2 and 3 of the drawings. In FIGURE 2, data from a series of cupric nitrate solutions were used as a basis for comparing the effects of another ion in aqueous solution with the effects of the chloride ion, which is the predominant ion present in the reaction mixture used for preparing 1,2-dichloroethane in a continuous process as hereinafter described. The nitrate salt was selected because nitrate ions generally show very little tendency to form complexes with metal ions. Therefore, the cupric ion should exist predominantly as the aquo-complex $[Cu(H_2O)_4]^{++}$ rather than being partially tied up or sequestered by complexing with the nitrate ion. In other words, interference by the nitrate ion with the full shielding effect of the paramagnetic cupric ion on the water proton is minimized.

In the cupric nitrate solutions, the relationship between the width of the water proton signal at half height and the concentration of the cupric ion was observed to be linear for concentrations of the cupric ion up to about 3 moles. As the concentration of the cupric ion is increased above 3 moles, the effective magnetic moment of this ion appears to increase, resulting in a more rapid broadening of the water proton spectrum line until the concentration of the cupric ion reaches about 5 moles. The effective magnetic moment of the cupric ion then appears to decrease rapidly with increasing concentration with the result that the broadening effect on the water proton spectrum line decreases. The explanation for this behavior is not fully understood.

The relatively greater tendency of the chloride ion to form complexes with metallic ions such as the cupric ion is reflected by the relative positions of the two curves appearing in FIGURE 2. Thus, the curve developed from the cupric chloride solutions shows that a given concentration of cupric ions in such solutions develops less response by the NMR spectrometer than a corresponding concentration of cupric ions in the cupric nitrate solutions.

The effects of the inclusion in cupric ion-containing aqueous solutions of other ionic species can be noted in referring to FIGURE 3 of the drawings. The relationship water proton signal. This effect is thought to be due to the high concentration of chloride ion in the solution. It is known that in aqueous solutions equilibria of the type

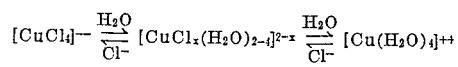

appear to exist. The complex $[CuCl_4]^{--}$ is less stable than the complex $[Cu(H_2O)_4]^{++}$. If the chloride concentration is low, the equilibrium is shifted far to the right, and the concentration of chloride ions in the coordination sphere is substantially negligible. On the other hand, if the concentration of chloride ions is high, the equilibrium is shifted to the left and complexes containing chloride ions may exist.

The paramagnetic dipole associated with the unpaired electron in the cupric ion affects the ¹H nuclei of water molecules in the coordination sphere much more than those of free water molecules. In fact, in the absence of exchange between free water molecules and coordinated water molecules, two signals would be observed in the NMR spectrum. Since free water molecules are exchanging rapidly with coordination sphere water molecules, however, only one NMR signal is observed and represents an average of all proton environments. When chloride ions compete for sites in the coordination sphere, the average environment of the water proton environment is shifted toward that of the free water molecules. This shift reduces the line width of the water signal. The effect of chloride ions on the line width of the water proton signal in the presence of the cupric ion can be approximated by the expression $$\text{line width, in c.p.s.} \approx 74\{[Cu\ (II)] - 0.2[Cl^-]\}$$

In referring to FIGURE 3, the concentration of cuprous ions in the aqueous solutions will also be perceived to have some effect on the NMR response to a given concentration of cupric ion. The cuprous ion forms a very stable complex, $CuCl_2^-$, in the presence of excess chloride ion. The effective magnetic moment of the cupric ion in excess chloride is increased by the presence of the cuprous ion since the $CuCl_2^-$ complex tends to remove chloride ion from solution and shifts the equilibrium accordingly as described above. The cuprous ion provides some magnetic dipole interactions which may also contribute to the broadening of the spectral line. In any event, the net result of the addition fo cuprous ion to the aqueous system is to increase the water proton spectrum line width as indicated by FIGURE 3. This broadening effect of the presence of the cuprous ion when the aqueous solution contains cupric ions and excess chloride ions can be approximated by the expression line width (c.p.s.)≈74{[Cu(II)]
$$-0.2[Cl^-]+0.8[Cu(I)]\}$$

Calcium ions in the presence of cupric ions and excess chloride ions also function to increase the line width of the water proton signal. The mechanism appears to be a magnetic dipole interaction and effect on exchange rates between water molecules and the cupric ion coordination shell and lattice. The effect of the presence of the calcium ion can be approximated by the expression line width (c.p.s.)≈74{[Cu(II)]
$$-0.2[Cl^-]+0.3[Ca^{++}]\}$$

In summary, as evidenced by the foregoing considerations and the data plotted in FIGURE 3, it is apparent that the cuprous, calcium and chloride ions all affect to some extent the determination of the cupric ion by NMR spectroscopy. In instances such as the preparation of 1,2-dichloroethane using a copper chloride catalyst system in the manner hereinafter described, the concentration of the calcium chloride and copper ions will be substantially constant and only the ratio of the cupric to cuprous ions remains as a variable. A typical working curve for a system of this type is plotted in FIGURE 3 (points with symbol +). It will be noted that this curve is sufficiently linear to be used to monitor the cupric ion concentration in this system, provided that the calcium and chloride ion concentrations are not permitted to vary greatly. If, on the other hand, analyses are to be made of systems which vary widely in the character and concentration of the ionic species present therein, the method hereinbefore broadly outlined which requires the development of a standard curve for the particular solution under anlaysis must be followed.

As has been previously indicated herein, a more specific and particularly useful aspect of the present invention is the use of NMR spectroscopy for monitoring and controlling the concentration of cupric ion in a copper chloride catalyst system used to promote the oxyhydrochlorination of ethylene to produce 1,2-dichloroethane in a continuous process. In producing 1,2-dichloroethane by the oxyhydrochlorination of ethylene using an aqueous copper chloride solution as a catalyst, either a single vessel system using oxygen directly with hydrochloric acid and ethylene can be used, or a two-step system using air can be employed. In the latter process, the reaction to yield 1,2-dichloroethane (reaction (2) hereinbefore set forth) is carried out in one step, and the catalyst regeneration (reaction (3)) is carried out in a separate step. In both procedures, the total copper content and the Cu(II) to Cu(I) ratio in the catalyst strongly affect its activity and the presence of both ionic species is essential to the process.

FIGURE 4 is a flow diagram for the one-step process using oxygen directly for carrying out the reaction

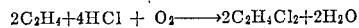

in a single reaction vessel. Oxygen, ethylene and gaseous HCl are introduced to the bottom of the reactor 20 at the desired operating pressure via conduits 12, 14 and 16, respectively. Aqueous HCl solution is also pumped into the bottom of the reactor 20 through conduit 18. The reactor 20 contains, in addition to the reactants, a catalyst system which may consist, for example, of about 7 moles of cupric chloride and 1 mole of cuprous chloride. Preferably, a copper chloride catalyst system modified by the addition of an inert solubilizing salt such as calcium chloride and containing about 6 moles of cupric chloride, 2 moles of cuprous chloride and 3 moles of calcium chloride is employed.

The exit gases from the reactor 20 are cooled to a desired temperature and partially condensed with cooling water in a heat exchanger 22. In a gas-liquid separator 24, the effluent from the heat exchanger 22 is separated into a stream of recycle ethylene gas, a layer of organic product, including the dichloroethane, and a water layer. The organic product is stored in a suitable storage tank 26, and the ethylene which separates therefrom is recycled through conduit 28 to the ethylene feed conduit 14 for re-charging to the reactor 20. The water layer from the gas-liquid separator 26 can be discarded, or may be subjected to distillation to recover the small portion of dichloroethane therein.

A stream of the reaction mixture is continuously removed from the bottom of the reactor 20 by line 40 and passed to a gas-liquid separator 42 where enough of the water in the catalyst solution is removed by flashing to maintain the material balance in the reactor. The water excess is the result of the aqueous hydrochloric acid solution fed to the reactor and the water of reaction (see reaction (1)). The reaction mixture from the gas-liquid separator 42 is pumped by pump 44 through a heat exchanger 46 back into the reactor 20. Although the overall reaction in the reactor 20 is exothermic, heat is supplied by the heat exchanger 46 to compensate the excess of latent heat of the evaporated water and other minor sensible heat losses above the heat of reaction.

For the purpose of permitting the total concentration of cupric ion, and the ratio of cupric to cuprous ion in the catalyst to be constantly monitored, and the process controlled in order to provide the optimum catalyst composition, a small slip stream of the reaction mixture is taken from the reactor 20 and is passed through a conduit 50 to a nuclear magnetic resonance spectrometer 52 which is pre-adjusted to respond to the spectrum line for the cupric ion. After passing through the NMR spectrometer, the reaction mixture is returned to the reactor 20 by the conduit 54. The response of the NMR spectrometer 52 to the presence of the cupric ions in the reaction mixture passed therethrough is used to actuate suitable regulating and controlling devices 56 and 58 to operate control valves 60 and 62 in the lines 12 and 16 used to convey oxygen and gaseous hydrochloric acid, respectively, to the reactor 20. In this manner, adjustment of the reactants may be accomplished to maintain catalyst activity at its maximum level in accordance with the monitoring of such activity which is accomplished with the NMR spectrometer. A suitable ethylene feed control system 64 is also provided to control ethylene feed to the reactor 20 via the conduit 14 and a suitable control valve 66.

The two-step procedure for producing 1,2-dichloroethane by the oxyhydrochlorination of ethylene is illustrated in the flow diagram set forth in FIGURE 5. In this procedure, ethylene is compressed to the operating pressure and is introduced to the bottom of the reactor 70 through a suitable conduit 72. The reactor 70 contains the catalyst solution which preferably comprises a total of 8 moles of copper chloride salts which vary from a ratio of 7.6 moles of cupric chloride to 0.4 mole of cuprous chloride in the solution introduced to the reactor 70 from the regenerator vessel 74, to a ratio of about 6 moles of cupric chloride to 2 moles of cuprous chloride in the solution discharged from the bottom of the reactor via conduit 76 for circulation to the regenerator vessel for the purpose hereinafter described.

The product gases from the reactor 70 are cooled in a suitable heat exchanger 78 and the condensate and recycle ethylene are separated in the gas-liquid separator 80 as described in referring to the one-step process depicted in FIGURE 4. The ethylene gas from the gas-liquid separator 80 is recycled to the reactor 70 through conduit 82 by a pump 84, and the 1,2-dichloroethane product is passed to a storage tank 86. The ethylene which separates from the dischloroethane in the storage tank is recycled to the conduit 72 by conduit 88.

Air and dry HCl are compressed to the operating pressure and are introduced via conduits 90 and 92, respectively, to the bottom of the regenerator vessel 74. An aqueous hydrochloric acid solution is also pumped into the regenerator vessel 74 through conduit 94.

The circulation of the catalyst solution in the system initially carries the catalyst solution from the reactor 70 via conduit 76 to a flash tank 96 where water is evaporated to keep the reactor in material balance, and where ethylene dissolved in the catalyst solution is stripped therefrom. The temperature of the catalyst solution is then slightly adjusted in the heat exchanger 98 before the stream is split with a portion being passed into the regenerator vessel 74 and a portion to an NMR spectrometer 100. The portion of the catalyst solution which is directed to the NMR spectrometer 100 is a relatively small slip stream and this stream is returned from the spectrometer to the regenerator vessel 74 by a small conduit 102. In the regenerator vessel 74, a portion of the cuprous ions in the solution is reconverted by oxidation to the higher valence state. Therefore, the catalyst and reactants solution returned to the reactor 70 from the regenerator vessel 74 via conduit 104 contains substantially the same total molar concentration of copper salts, but is richer by about 20 percent in cupric ions than the spent catalyst solution discharged from the reactor 70 for passage through the conduit 76 to the regenerator vessel. A small slip stream is removed from the conduit 104 and passed through an NMR spectrometer 106 and then recirculated via conduit 108 to the reactor 70.

By the use of the NMR spectrometer 100 in the two-step process depicted in FIGURE 5, the composition of the catalyst solution entering the regenerator vessel 74 from the reactor 70 can be constantly monitored, and the air and HCl introduced to the regenerator vessel 74 controlled from said NMR spectrometer as required in order to achieve the desired extent of regenerative conversion of cuprous to cupric ions. Moreover, the output from the regenerator vessel 74 to the reactor 70 can also be continuously monitored using the NMR spectrometer 106 and the input of ethylene to the reactor controlled in response to the cupric ion content detected by this spectrometer.

From the foregoing description of the invention, it will have become apparent that the present invention provides a novel and highly useful technique for determining the concentration of cupric ions in the presence of cuprous ions in solutions which contain no other paramagnetic or ferromagnetic ions. The method is nondestructive, rapid and accurate, and is especially useful for continuously determining the concentration of cupric ions in plant process streams where rapid and nondestructive analysis is highly desirable. In a special application of the analytical technique of the invention, the procedure is used to continuously monitor the composition of a copper chloride catalyst solution used for producing dichloroethane by the direct oxyhydrochlorination of ethylene.

It should be pointed out that although the method of the invention has been described as it is carried out by measuring the width at half-height of the absorption mode of the 'H nuclei spectrum, the analysis can also be effectively performed using the dispersion mode of this nuclei, measuring the difference in frequency between the maximum and minimum points of the dispersion trace.

Although certain specific aspects of the invention have been described in the foregoing specification by way of example and in order to provide a sufficient disclosure to enable one skilled in the art to practice the invention, it will be readily appreciated that certain modifications and changes can be made in the described steps and process conditions without departure from the fundamental and basic principles which underlie the invention. Therefore, such changes and modifications as do not involve a departure from, or relinquishment of, such basic principles are deemed to be circumscribed by the spirit and scope of the present invention except as the same may be necessarily limited by the appended claims or reasonable equivalents thereof.

I claim:

1. A method for determining the concentration of cupric ions in an aqueous solution substantially free of other paramagnetic and ferromagnetic ionic species which comprises:
    (a) determining the total concentration and qualitative character of the ions in said aqueous solution except the cupric ion, oxygen and hydrogen;
    (b) developing a standard curve for solutions containing varying known concentrations of cupric ions and otherwise identical to the solution containing the unknown amount of cupric ion to be determined, and in which curve the cupric ion concentration is plotted against a dimension of the 'H nuclei nuclear magnetic resonance spectrum line for various known concentrations of cupric ion in said solution which dimension is indicative of the broadening of the spectrum line caused by the presence of cupric ions;
    (c) obtaining the nuclear magnetic resonance spectrum of said solution containing the unknown concentration of cupric ion which it is desired to determine;
    (d) measuring said dimension of the 'H nuclei spectrum line appearing in the obtained spectrum; and
    (e) determining the concentration of cupric ion in said solution by comparing the measured dimension of said 'H nuclei spectrum line with said standard curve.

2. The method of claim 1 wherein said 'H nuclei nuclear magnetic resonance spectrum line is the absorption mode of the 'H nuclei spectroscopic signal and the measured dimension of the absorption mode is its width at half-height.

3. The method of claim 1 wherein said 'H nuclei nuclear magnetic resonance spectrum line is the dispersion mode of the 'H nuclei spectroscopic signal and the dimension is the difference in frequency between the maximum and minimum points of the dispersion trace.

4. The method of claim 1 wherein said aqueous solution consists essentially of water and cupric nitrate.

5. A method for determining the concentration of cupric ions in an aqueous solution containing cuprous ions and substantially free of other paramagnetic and ferromagnetic ionic species which comprises:
    (a) determining the total concentration and qualitative character of the ions in said aqueous solution except the cupric ion and cuprous ion, oxygen and hydrogen;
    (b) developing a standard curve for solutions containing varying known concentrations of cupric ions and otherwise identical to the solution containing the unknown amount of cupric ion to be determined, and in which curve the cupric ion concentration is plotted against the width at half-height of the 'H nuclei nuclear magnetic resonance absorption spectrum line for various known concentrations of cupric ion in said solution;
    (c) obtaining the nuclear magnetic resonance spectrum of said solution containing the unknown concentration of cupric ion which it is desired to determine;
    (d) measuring the width at half height of the 'H nuclei spectrum line appearing in the obtained spectrum; and
    (e) determining the concentration of cupric ion in said solution by comparing the measured width of said 'H nuclei spectrum line with said standard curve.

6. The method of claim 5 wherein said solution is an aqueous solution consisting essentially of water and cuprous chloride and cupric chloride salts.

7. The method of claim 5 wherein said solution is an aqueous solution consisting essentially of water and chloride salts.

8. The method of claim 5 wherein the molar concentration of cupric ions in said solution varies from about zero to about 9.

9. The method of claim 5 wherein said solution consists essentially of water, cupric chloride, cuprous chloride, calcium chloride and hydrochloric acid.

10. The method of claim 7 wherein said aqueous solution contains calcium chloride.

11. The method of continuously monitoring and controlling the oxidative state of copper ions in an aqueous solution containing copper salts with the copper present in at least the cupric valence state, containing no paramagnetic or ferromagnetic ions except copper ions, and having a substantially constant composition except for variations in the ratio of cupric to cuprous ions, said method comprising:
  (a) empirically determining the nuclear magnetic resonance spectrometer response to the $^1$H nuclei in said aqueous solution when said ratio of cupric to cuprous ions is at the desired value which response is indicative of the broadening of the spectrum line caused by the presence of cupric ions;
  (b) continuously passing a portion of said solution through a nuclear magnetic resonance spectrometer;
  (c) continuously causing said spectrometer to respond to the $^1$H nuclei in the portion of the aqueous solution passed therethrough;
  (d) introducing an oxidizing agent to said aqueous solution in correspondence to departures in the continuous response of said spectrometer from its empirically determined response when the desired ratio of cupric to cuprous ions exists in said solution; and
  (e) removing a reduced material derived from said oxidizing agent from said aqueous solution to maintain the described substantially constant composition thereof.

References Cited

UNITED STATES PATENTS 3,045,175   7/1962   Rollwitz _____ 324—0.5

MORRIS O. WOLK, *Primary Examiner.*

R. M. REESE, *Assistant Examiner.*

U.S. Cl. X.R.

23—253; 260—659; 324—.5